United States Patent [19]

van Essen et al.

[11] Patent Number: 4,489,050
[45] Date of Patent: Dec. 18, 1984

[54] METHOD OF PREPARING A HYDROGEN-ABSORBING ALLOY

[75] Inventors: Roelof M. van Essen; Kurt H. J. Buschow, both of Eindhoven, Netherlands

[73] Assignee: U.S. Philips Corporation, New York, N.Y.

[21] Appl. No.: 495,915

[22] Filed: May 20, 1983

Related U.S. Application Data

[63] Continuation of Ser. No. 241,179, Mar. 6, 1981, abandoned.

[30] Foreign Application Priority Data

Mar. 5, 1980 [NL] Netherlands .................. 8001314

[51] Int. Cl.³ .............................................. C01B 6/00
[52] U.S. Cl. .................................. 423/644; 420/900; 420/434; 148/3
[58] Field of Search ............. 75/134 M; 423/644, 645, 423/648 R; 420/434; 198/3

[56] References Cited

U.S. PATENT DOCUMENTS 4,142,300 3/1979 Gruen et al. ...................... 340/15

FOREIGN PATENT DOCUMENTS 1508764 4/1978 United Kingdom .

OTHER PUBLICATIONS

Intermetallic Compounds, edited by J. H. Westbrook, pp. 198-201, John Wiley & Sons, Inc. (1967).
Metals Reference Books, C. J. Smithells, p. 156.
Pebler A. et al., "Equlibrium Studies on the Systems $ZrCr-H_2$, $ZrV_2H_2$, and $ZrMo_2-H_2$ between 0° and 900° C. Trans AIME vol. 239, Oct. 1967, pp. 1593-1600.
Panda, S. C., Bhan S., "Alloying Behavior of Zirconium With Other Transition Metals, Z Metallkde, 64(1973) H.11 pp. 793-799.
Shattiel, D., Jacob, I., Davidov, D. "Hydrogen Absorption and Desorption Properties of $AB_2$ Laves-Phase Pseudobinary Compounds" J. Less Comm Metals 53(1977) pp. 117-131.
Van Mal, H. H., Buschow, K. H. J. Miedema, A. R., "Hydrogen Absorption in $LaNi_5$ and Related Compounds: Experimental Observations and Their Explanation, J. Less Comm Metals 35(1974) pp. 65-76.

*Primary Examiner*—L. Dewayne Rutledge
*Assistant Examiner*—Christopher W. Brody
*Attorney, Agent, or Firm*—Marc D. Schechter

[57] ABSTRACT

Alloys consisting of from 64 to 77 atomic percent of manganese with the remainder zirconium are not suitable without further processing as a material for storing hydrogen at technically desired pressures. This property can be advantageously influenced by a heat treatment until a homogeneous C14 type of Laves phase has been obtained.

7 Claims, 3 Drawing Figures

METHOD OF PREPARING A HYDROGEN-ABSORBING ALLOY

This is a continuation of application Ser. No. 241,179, filed Mar. 6, 1981, now abandoned.

BACKGROUND OF THE INVENTION

The invention relates to a method of preparing a zirconium-manganese alloy suitable for storing hydrogen.

An article entitled "Hydrogen Absorbtion and Desorption Properties of $AB_2$ Laves-Phase Pseudobinary Compounds" by D. Shaltiel et al (Journal of the Less-Common Metals, volume 53 pages 117-131, 1977 discloses that a compound having the composition $ZrMn_2$ is capable of absorbing hydrogen. At a hydrogen pressure of 8 atmospheres at room temperature, 1 molecule of $ZrMn_2$ can absorb 3.6 atoms of hydrogen. However at 50° C. the hydrogen pressure of the compound $ZrMn_2H_{3.6}$ was only 0.007 atmospheres. At 80° C. this pressure is as low as 0.03 atmospheres. According to British Patent Specification No. 1,508,764, the binary alloys of zirconium with manganese, such as $ZrMn_2$, are not suitable for practical use for hydrogen storage as they have insufficient plateau pressures at suitable temperatures and pressures.

SUMMARY OF THE INVENTION

It is an object of the present invention to prepare alloys of the $ZrMn_2$ type, which are suitable for hydrogen storage.

According to the invention this object is accomplished by means of a method in which an alloy is prepared consisting of from 64 to 77 atomic percent manganese, with the remainder zirconium. The alloy is cast, after which the casting is heated in vacuum or in an inert atmosphere to an elevated temperature below its melting point until a homogeneous single C14 type of Laves phase has been obtained.

The present invention is based on the discovery that in the zirconium-manganese alloy system, a uniform alloy phase of the type $ZrMn_2$ exists, which has a range of existence from 64 to 77 atomic percent Mn with the remainder being Zr, the crystal structure of which is of the hexagonal Laves phase C14 type. The a and the c parameters of the crystal lattice vary from 5.045 Å to 4.980 Å for a and from 8.282 Å to 8.175 Å for c.

For the entire range of compositions the relevant alloys share the property that no second phase precipitation occurs. Such second phases which may occur in comparable alloys, such as in titanium-manganese alloys may have a negative effect on the ability to store and to release hydrogen. It also means that the castings need not be quenched in order to maintain at room temperature the advantageous structure produced.

Preferred heating temperatures are temperatures between 900° C. and 1150° C. After the casting has been subjected to the heat treatment, it is pulverized and exposed to a hydrogen atmosphere. The materials need not be subjected a special activation treatment.

At 20° C. the zirconium-manganese alloys prepared according to the invention have plateau pressures lower than 10 atmospheres ($10^6$ Pa). The plateau pressure of a given alloy depends on the alloy composition. It has been found that at ambient temperature an alloy having the composition 64.3 atomic percent Mn with remainder Zr ($ZrMn_{1.8}$) has a plateau pressure of 0.1 atmospheres ($10^4$ Pa), while more than 90% of all the stored hydrogen can be withdrawn from the material at this pressure.

DESCRIPTION OF THE PREFERRED EMBODIMENTS

Embodiment I

Alloys were prepared having the compositions $ZrMn_{1.6}$, $ZrMn_{1.8}$, $ZrMn_{2.4}$, $ZrMn_{3.2}$, $ZrMn_{3.6}$ and $ZrMn_{4.4}$ by melting together elements having a purity of 99.9% and by heating these elements thereafter in a vacuum at 1050° C. for 3 days. By means of X-ray photographs, the principal reflection lines of these compositions were indexed on the basis of the hexagonal Laves phase structure (C14 type).

Figure 1:
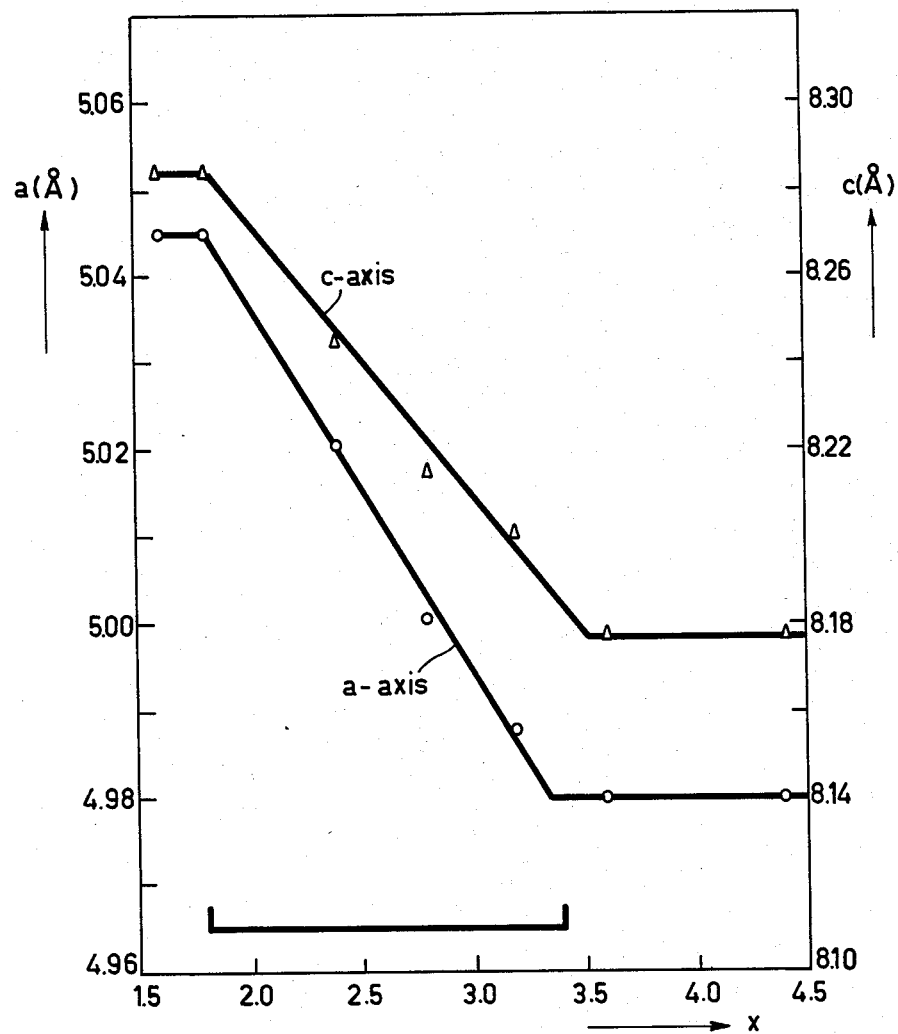
FIG. 1 is a graph showing the variations of the lattice parameters a and c versus the composition of the alloy $ZrMn_x$.

FIG. 1 shows the results of the X-ray analyses. A graduated scale in Å is provided on the left-hand vertical axis for the a-axis, and a graduated scale in Å is provided on the right-hand vertical axis for the c-axis. Curve a shows the variation of the a-axis, curve c of the c-axis. In the compositional range $ZrMn_{1.8}$ to $ZrMn_{3.4}$ the lattice constants change considerably. For compositions outside this range they remain constant. These compositions might therefore be considered as limit compositions for the uniform range of alloys having a C-14 structure. These compositions correspond to 64.3 atomic percent Mn with the remainder Zr, and 77.3 atomic percent Mn with the remainder Zr, respectively.

Embodiment II

Castings having the compositions $ZrMn_x$, x being 1.8, 2.0, 2.4, 2.8, 3.0, 3.2, were produced. The castings were pulverized without having been subjected to a thermal treatment, and were thereafter exposed to a 40 atmospheres (4.10 Pa) hydrogen atmosphere at a temperature of 50° C. Hydrogen was absorbed and desorbed again at a reduced pressure from the samples for a few cycles.

Figure 2:
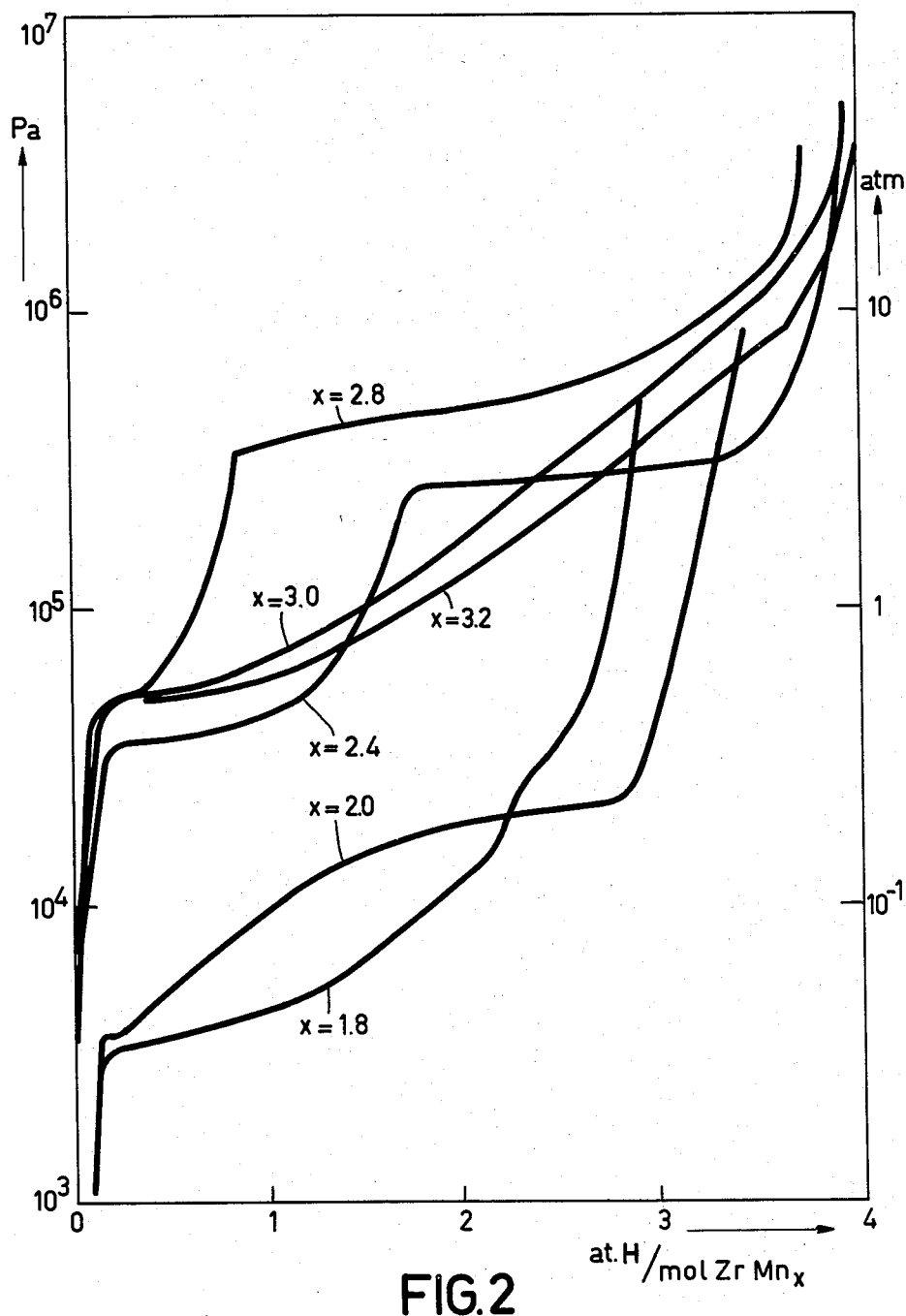
FIG. 2 is a graph showing the dependence of the quantity of absorbed hydrogen in alloy compositions $ZrMn_x$ on the hydrogen pressure. The alloys have not been thermally treated as required by the invention.

Thereafter the hydrogen-isotherm (hydrogen pressure versus composition) was measured at room temperature. FIG. 2 shows the results of these measurements. The hydrogen pressure is plotted in Pascal on the vertical axis, the number of absorbed gram atoms of hydrogen per gram-molecular weight of $ZrMn_x$ are plotted on the horizontal axis.

It appears from FIG. 2 that, without having been subjected to a thermal treatment, none of the tested compositions has a single, sharp plateau pressure. With different compositions different levels occur in the investigated pressure range. This is very pronounced for the composition $ZrMn_{2.4}$. For this composition, a hydride having the composition $ZrMn_{2.4}H$ is formed at approximately 0.25 atmospheres a hydride of the composition $ZrMn_{2.4}H_3$ is formed at a pressure of approximately 2.5 atmospheres.

Embodiment III

Thereafter, alloys having the compositions $ZrMn_{1.8}$, $ZrMn_{2.4}$ and $ZrMn_{2.8}$ were prepared according to the invention.

The alloys were melted together from the elements having a purity of 99.9%. The castings were heated in a vacuum at 1050° C. for 3 days. Thereafter, after having been cooled to ambient temperature, the castings were pulverized and exposed to hydrogen at a pressure of 40 atmospheres at a temperature of 50° C. Hydrogen was absorbed and desorbed several times. Hereafter the isotherm of the hydrogen pressure versus the composition was measured at ambient temmperature.

Figure 3:
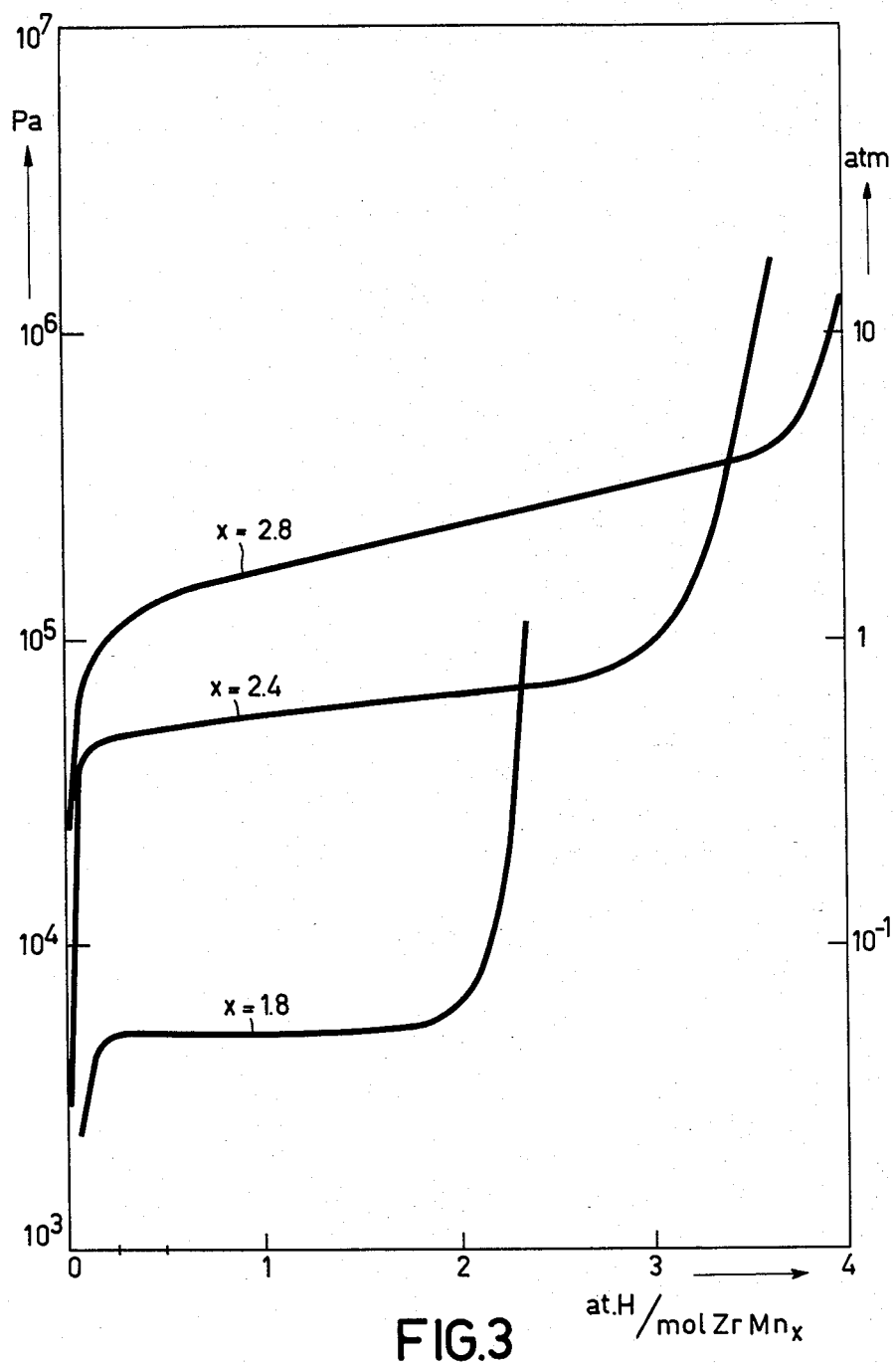
FIG. 3 is a graph showing the dependence of the quantity of hydrogen absorbed in alloys having the composition $ZrMn_x$, which were prepared according to the invention, on the hydrogen pressure.

FIG. 3 shows the results of the above-described experiments. It can be seen that the hydrogen concentration in the alloys has become considerably less dependent upon the pressure in the plateau region of the curve. The double levels have disappeared.

The measurements were repeated for a number of samples which were quenched after the thermal treatment; it appeared that no change in the hydrogen-absorbing capacity had occurred.

FIG. 3 shows that substantially the total quantity of hydrogen can be withdrawn from the alloy at the plateau pressure. This increases the suitability of the material for use as a hydrogen-absorbing material.

The alloys which were prepared according to the invention can be used in hydrogen-storage arrangements.

What is claimed is:

1. A method of preparing an alloy of zirconium and manganese suitable for storing hydrogen, said method comprising the steps of:

preparing a mixture consisting essentially of 64 to 77 atomic percent manganese with the remainder being zirconium;

casting the mixture to produce a casting having a melting point; and heating the casting in a vacuum or in an inert atmosphere at a temperature between 900° and 1150° C. and below the melting point until a homogeneous single C14-type of Laves phase has been obtained.

2. A method as claimed in claim 1, characterized in that the alloy consists essentially of 70.6 atomic percent manganese and 29.4 atomic percent zirconium.

3. A hydrogen-absorbing alloy prepared according to the method of claim 2.

4. A hydrogen-absorbing alloy prepared according to the method of claim 1.

5. A hydrogen-absorbing alloy prepared according to the method of claim 1.

6. A method of storing hydrogen comprising the steps of: providing an alloy of zirconium and manganese, and alloy consisting essentially of 64 to 77 atomic percent manganese with the remainder zirconium, said alloy having a homogeneous single C14-type of Laves phase, said alloy having a plateau pressure; and exposing the alloy to hydrogen to a pressure at or above the plateau pressure; characterized in that the alloy is prepared by the steps of: preparing a mixture consisting essentially of 64 to 77 atomic percent manganese with the remainder being zirconium; casting the mixture to produce a casting having a melting point; and heating the casting in a vacuum or in an inert atmosphere at a temperature between 900° and 1150° C. and below the melting point until a homogeneous single C14-type of Laves phase has been obtained.

7. A method as claimed in claim 6, characterized in that the alloy consists essentially of 70.6 atomic percent manganese and 29.4 atomic percent zirconium.

* * * * *